United States Patent [19]

Harrison et al.

[11] Patent Number: 5,077,121

[45] Date of Patent: Dec. 31, 1991

[54] HIGH STRENGTH HIGH MODULUS POLYOLEFIN COMPOSITE WITH IMPROVED SOLID STATE DRAWABILITY

[75] Inventors: Ian R. Harrison, State College, Pa.; George B. Klingensmith, Houston, Tex.

[73] Assignee: Shell Oil Company, Houston, Tex.

[21] Appl. No.: 263,576

[22] Filed: Oct. 27, 1988

[51] Int. Cl.$^5$ .............................................. B32B 7/02
[52] U.S. Cl. .................................. 428/213; 428/516; 428/910; 428/911
[58] Field of Search ................ 428/910, 516, 911, 213

[56] References Cited

U.S. PATENT DOCUMENTS

| | | | |
|---|---|---|---|
| 4,125,660 | 11/1978 | White et al. | 428/218 |
| 4,282,277 | 8/1981 | Austen et al. | 428/36 |
| 4,297,415 | 10/1981 | Ward et al. | 428/516 |
| 4,348,350 | 9/1982 | Meier et al. | 264/570 |
| 4,380,567 | 4/1983 | Shigemoto | 428/213 |
| 4,413,110 | 11/1983 | Kavesh et al. | 526/348 |
| 4,451,524 | 5/1984 | Matsummato | 428/213 |
| 4,456,660 | 6/1984 | Colombo | 428/516 |

FOREIGN PATENT DOCUMENTS

| | | |
|---|---|---|
| 39873 | 8/1972 | Japan . |
| 21537 | 7/1985 | Japan . |
| 173637 | 1/1987 | Japan . |
| 1495776 | 12/1977 | United Kingdom . |

OTHER PUBLICATIONS

"Multilayer Plastic Films" by W. J. Schrenk, Applied Polymer Symposium No. 24, pp. 9-12, (1974).
"Some Physical Properties of Multilayer Films" by W. J. Schrenk & T. Alfrey, Jr., Polym. Eng. Sci., vol. 9, No. 6, pp. 393-399 (11/69).
"Mechanical Interactions in Laminated Sheets II", by Sudershan et al., J. Macromol Sci.-Phys. B 19(4), pp. 743-771 (1981).
R. S. Porter, et al, Polymer Journal, 15, p. 327 (1983). Ibid, 16, p. 75 (1984).
Furuhata et al., Journal of Polymer Science: Polym. Phys. Ed., vol. 22, p. 133 (1984).
Porter et al, Polymer Engineering Science, 18, p. 861 (1978).
DSM, C and EN, Feb. 6, 1984, p. 17.
General Technologies Applications, Advanced Materials, vol. 5, No. 19, Nov. 14, 1983, p. 4.
Kaito et al, J. Appl. Polym. Sci., vol. 20, p. 1241 (1985).
Woodhams et al, paper presented at the Chemical Institute of Canada Conference, Kingston, Ontario, Jun. 3-5, 1985.
Kunigi, New Materials and New Processes, vol. 1, 58 (1981), p. 4.

Primary Examiner—Edith Buffalow

[57] ABSTRACT

A high modulus, high strength coextruded polyolefin composite which can be drawn to higher draw ratios than single sheets of the polymers of which it is made is disclosed. It comprises a core layer of a polymer selected from the group consisting of polypropylene, polyethylene and linear low density polyethylene, and cap layers of a polymer selected from the group consisting of polybutylene homopolymers and copolymers with ethylene.

4 Claims, 2 Drawing Sheets o MOPP IV (ROOM TEMP.) 78°F CONSTANT
□ MOPP IV (HOT TEMP.)* 105°F AT 85 PSIG, 78°F AT 60 PSIG, 55°F AT 40 PSIG
△ MOPP III (ROOM TEMP.) 78°F CONSTANT
▽ MOPP III (HOT TEMP.)* 105°F AT 85 PSIG, 78°F AT 60 PSIG, 55°F AT 40 PSIG

*(HOT TEMP.-105°F FROM 0 HR TO 4 HR)

HIGH STRENGTH HIGH MODULUS POLYOLEFIN COMPOSITE WITH IMPROVED SOLID STATE DRAWABILITY

BACKGROUND OF THE INVENTION

Today, in industry there are many engineering plastics with a broad range of properties. For some applications, the engineer may want a combination of properties inherent in several different types of plastics. One way to obtain these different properties is to develop techniques that will combine these materials while maintaining their desirable qualities. Coextrusion of multilayered sheet and film is such a technique. Some of the more desirable material properties are good corrosion, light, or temperature resistance, gas/moisture permeability with organoleptics (aroma/taste barrier properties), high tensile strength, high elongation and desirable electrical properties. It is also a necessary requirement that, after forming, multilayer polymer sheets should not delaminate in use. Good bonding between the two polymers is often achieved by holding them together under pressure in the molten state. This can be accomplished by coextruding the polymer sheet from a single die orifice.

The ultimate theoretical strength properties of polymeric materials are generally calculated based on a state in which the molecules are fully extended and are perfectly aligned and packed to maximize the forces of intermolecular attraction. This ideal condition is never achieved in practice and the properties expressed by a particular fabricated form of a polymeric material are some (usually small) fraction of the theoretical as determined by the extent to which the fully extended, perfectly aligned state is approached under the conditions imposed by the particular method of fabrication. In the case of polyolefins, and specifically for polypropylene, the theoretical modulus is calculated to be about 7 million psi, representing a theoretically achievable draw ratio of around 100. For existing commercial processes, such as that for producing monoaxially drawn strapping tape, ribbon, or fibrillated fiber, operation at economically high rates (>30 meters/min) with practical feedstocks of conventional types of polypropylene gives rise to draw ratios of 6 to 8 and modulii of 400–500 thousand psi. Attempts to develop higher draw ratios and properties lead to tape breakage and/or fibrillation.

The production of high modulus films and fibers by various methods of deformation of thermoplastics has become commonplace in industry. There are many methods which are currently used for producing high modulus and high strength films and fibers in industry. Deformation processes such as roller-drawing, hydrostatic extrusion, solid state extrusion, gel spinning/hot drawing, superdrawing and zone-annealing have been employed to try and achieve the highest possible strength and modulus. The gel spinning/hot drawing technique currently produces the highest strength and modulus fibers of polyethylene. The modulii of these fibers have been reported to be as high as 120 CPa (17.4 MM psi) with a breaking tensile strength just over 4.0 GPa (580M psi). A similar technique, drawing dry gels crystallized from dilute solution, currently produces the highest strength and modulus polypropylene films with a Young's modulus of 36 GPa (5.2 MM psi) and a tensile strength of 1.08 GPa (146M psi).

Gel spinning and drawing dry gels are excellent methods for producing high strength fibers and films but they have a number of inherent problems. Generally speaking, the techniques are a high technology method requiring specific polymer molecular weights and distributions. In addition, the gel spinning technique requires extensive solvent removal schemes such that the costs for these polyolefin fibers are comparable to acid spun high temperature aromatic polyamides. Methods which avoid solvents typically produce materials with significantly lower mechanical properties and/or the rate of the production does not offer much hope of being commercial in the forseeable future.

On the other hand, recent patent and open literature publications describe other ways to approach much closer to the theoretical limits. Those which develop the highest strength in polyolefins are based on complex and elaborate processes and require non-conventional, expensive, ultra-high molecular weight forms of the polyolefin feedstock. The processes in this category are:
 (1) Process for drawing mats of solution-grown crystals of ultra-high molecular weight polyolefins, reported by R. S. Porter, et al, *Polym. J.*, 15, 327 (1983)., ibid., 16, 75 (1984); and by Furuhata, et al, *J. Polym. Sci.: Polym. Phys. Ed.*, Vol. 22, 133 (1984).
 (2) Process for high-pressure solid-state extrusion of specially formed billets of ultra-high molecular weight polyolefins, reported by Porter, et al, *Polym. Eng. Sci.*, 18, 861 (1978).
 (3) Complex, multi-stage processes (discussed above) for the preparation and drawing of gel forms of ultra-high molecular weight polyolefins as claimed by Allied Corporation, U.S. Pat. No. 4,413,110, Nov. 1, 1983; by DSM, *C and EN*, Feb. 6, 1984, p. 17; and by General Technologies Applications, *Advanced Materials*, Vol. 5, No. 19, Nov. 14, 1983.

A second category of processes consists of processes that are claimed to utilize conventional commercial types of polyolefins as feedstocks (i.e., they are not dependent on expensive and generally unavailable ultra high molecular weight forms). These processes are reported to develop levels of strength and stiffness that are high, but more modest than developed by the schemes in the first category. The methods employ conditions and hardware that are complex and/or are not representative of conventional plastics processing systems in use or commercially available today nor have any of the approaches been demonstrated to achieve the highly extended state at any but very low rates of processing (although it is generally implied that high processing rate will be attainable with further development of methodology or equipment). Processes in this category are:
 (1) Processes for solid-state ultra-drawing polyethylene and polypropylene hydrostatically under high pressure (500–1000 bar) claimed by Meier and Jarecki, U.S. Pat. No. 4,348,350, Sept. 7, 1982.
 (2) Roller-drawing processes described by Kaito, et al, *J. Appl. Polym. Sci.*, Vol. 30, 1241 (1985); and by Woodhams et al, paper presented at the Chemical Institute of Canada Conference, Kingston, Ontario, June 3–5, 1985.

A third process category comprises a variety of solid phase stretch-forming and pressure-forming and forging methods. These generally produce substantially enhanced tensile strength and toughness, but give only moderate increases in stiffness. Some have been in limited commercial use for a decade or more. One example is:

(1) A recently introduced process of this kind, called BeXor, claims a particularly good balance of strength and toughness in thick-wall cylinder or sheet forms imparted by a method of solid-state hydrostatic extrusion; Kusan, Inc., U.S. Pat. No. 4,282,277.

A fourth category of solid-state processing is represented by two systems which adopt the approach of attempting to tailor the micro- and macro- features of the morphology of fiber or tape forms of polyolefins in manners which facilitate their drawability. They utilize conventional commercial varieties of polyolefins to produce polymer forms which exhibit substantially improved drawability in subsequent solid state stretching. The systems referred to are:

(1) Method for manufacturing polypropylene strap in a manner forming a gradation of cross sectional draw ratios from low at the surface to high at the center., Tsukasa Kasei Kogyo, U.S. Pat. No. 4,451,524, May 29, 1984.

(2) Zone-annealing method for preparation of ultra-high strength fiber; Kunugi, *New Materials and New Processes*, Vol. 1, 58 (1981).

We have a method for producing films with similar properties through tensile drawing with a heating device. It is desirable that such a process be both continuous and applicable to either thin or thicker sheets. Certainly our method can be readily modified to accomplish this goal. Further, control of the draw ratio is possible by adjusting the draw velocity and/or the draw temperature.

The concept of mutual mechanical reinforcement was initially conceived in terms of a high elongation material helping a high modulus low elongation material to undergo large ductile deformation before failing. Reportedly, layers of high modulus low elongation material were sandwiched between strongly adhering layers of high elongation material. The high elongation layers operate to prevent the propagation of transverse cracks across the high modulus layers. With crack propagation blocked, the high modulus low elongation layers become more ductile and all layers can deform simultaneously to large elongations. This allows the composite film to have both high modulus and high elongation.

Unfortunately, not all combinations of high elongation polymers and brittle polymers exhibit this behavior. Many times, a situation of "mutual interlayer destruction" is observed, i.e., the brittle polymer fails at its characteristic low elongation and causes a simultaneous, premature failure of the high elongation layers. See "Mulilayer plastic films" by W. J. Schrenk, *Applied Polymer Symposium* No. 24, pp. 9-12 (1974). Other related articles published by Dow include "Some Physical Properties of Multilayered Films", by W. J. Schrenk and T. Alfrey, Jr., *Polymer Engineering and Science*, Vol. 9 No. 6, pp. 393-399 (November 1969) and "Mechanical Interactions in Laminated Sheets. II", by Sudershan, K. Bhatega and Turner Alfrey, Jr., *J. Macromol. Sci.-Phys. B* 19(4), pp. 743-771 (1981).

The Dow publications describe the phenomenon of "mutual mechanical reinforcement in multilayer films" for systems which comprise thin layers of high modulus, low elongation material sandwiched between thin, adhering layers of highly elongatable material. When such a material is tested to failure in tension, it is observed that the high modulus material undergoes large ductile deformation before failing, much in contrast to the tensile behavior of the same material as a monolithic film. Example systems are PET/Aluminum Foil/PET, polyethylene/polystyrene/polyethylene, and polypropylene/polystyrene/polypropylene.

While the result in the Dow laminates is in part the same, i.e. enhanced extensibility of a component of a laminar composite over the extensibility of that component alone, the materials property sequence in the construction of our laminate is entirely different from the Dow systems (high elongation, low modulus material sandwiched between layers of low modulus, low elongation material, versus, high modulus, low elongation material sandwiched between layers of high elongation material) and the total synergistically-enhanced extensibility of our system is missing in the Dow composites. Accordingly, our observed results are not at all expected or predictable based on this prior art.

SUMMARY OF THE INVENTION

The present invention relates to a high modulus high strength coextruded polyolefin composite which can be drawn to higher draw ratios than single sheets of the polymers of which it is made. The composite comprises a core layer of a polymer selected from the group consisting of polypropylene, polyethylene and linear low density polyethylene and cap layers of a polymer selected from the group consisting of polybutylene homopolymers and copolymers with ethylene. It is preferred that the cap layers comprise from about 10% to about 20% of the thickness of the composite.

DETAILED DESCRIPTION OF THE INVENTION

Figure 1:
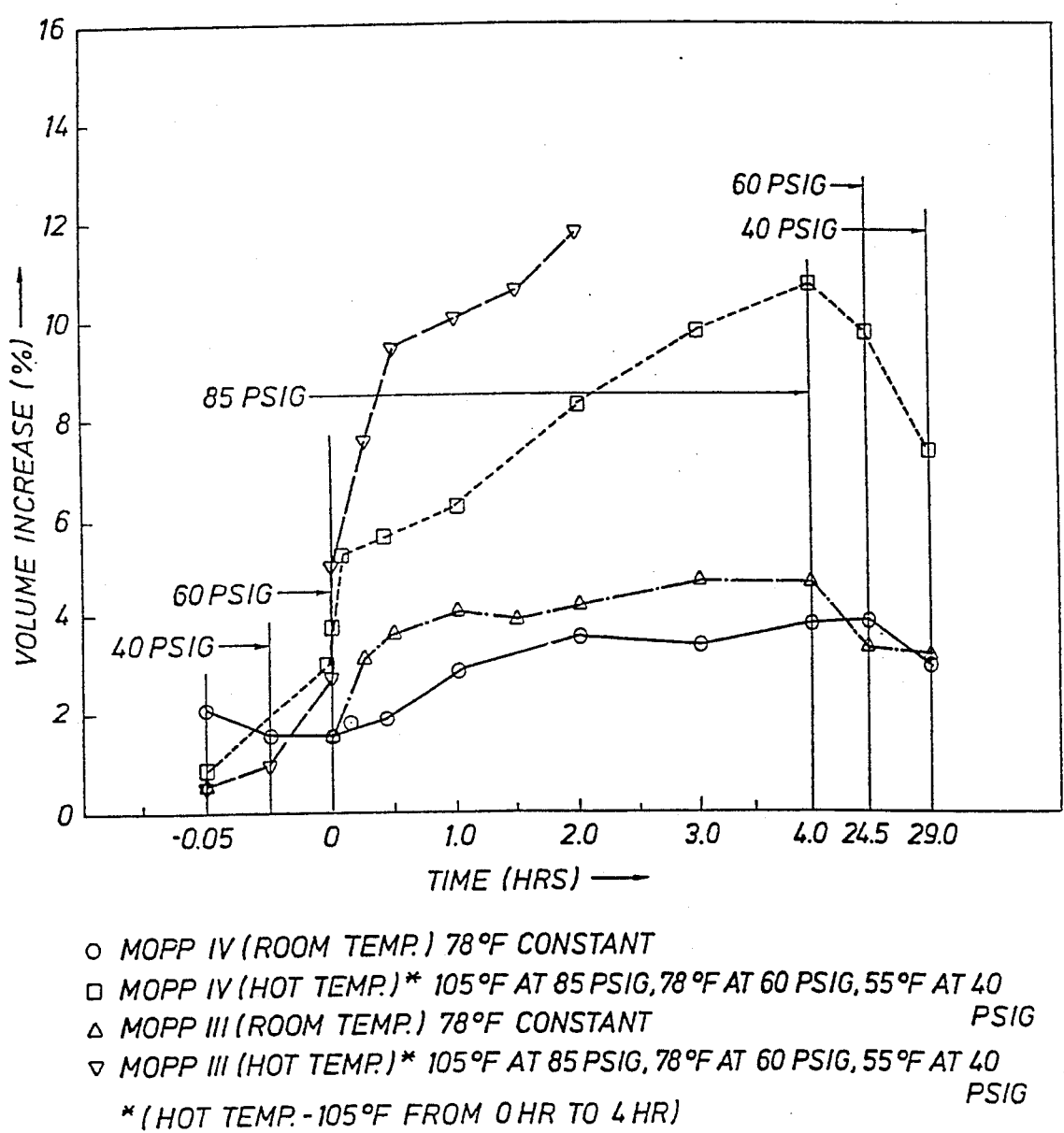

The invention herein comprises the surprising and unexpected discovery that composite compositions as described above exhibit substantially improved drawability in conventional solid state extensional processing, i.e. they can be drawn to much higher draw ratios at much higher draw rates than can monolithic sheets of either polymer. Thus, polypropylene alone exhibits a draw ratio of about 6 to 8 times its natural draw ratio in conventional drawing and polybutene-1 and its ethylene copolymers, because of their pronounced strain hardening characteristics, show even lower limits of 2-3 times. The composites described above are able to achieve draw ratios of greater than 15 times in commercial type equipment at rates regarded as commercially acceptable. In this highly extended state, the composite laminates exhibit tensile strength typically 70,000 psi (compared to 4,000-5,000 psi for unoriented polypropylene), 1% secant modulus 1.5 million psi (compared to 200,000 psi for unoriented polypropylene), elongation at break under 10% (compared to 300-700% for unoriented polypropylene) and exceptional creep resistance as exhibited by the low extent of volume swell and radial increase with time and temperature of pressurized cylindrical vessels constructed from the composite laminates (See FIG. 1).

The polybutene cap layers of the 3-ply laminates, because they have a substantially lower melting point than the polypropylene cores, also provide a means to weld multiple plys together at temperatures below which the highly oriented state of the core is adversely affected. A great variety of isotropically strong, high modulus structural, load bearing, pressure containing and anti-ballistic articles can thus be constructed from this material.

The concept of mutual mechanical reinforcement as described by Dow was discussed above. We theorize that we have discovered examples of mutual mechanical reinforcement that express an entirely different result than other examples represented by those cited above. In our case, an unexpected synergistic mechanical interaction develops when the more drawable polypropylene core in some manner promotes the extendability of the less drawable polybutylene polymer caps, while these caps in some manner convey enhanced extendability to the propylene core. While we do not profess to understand the physical origins of the synergistic interactions at the molecular levels, it is clear that one function of the tough polybutylene polymer layers is to arrest crack initiation and propagation in the polypropylene core and thereby prevent the fibrillar failure that is characteristic of monolithic polypropylene when drawn to high ratios at high rates in conventional processes. Thus, the extent to which the coextruded material can be synergistically drawn is significantly greater than would have been expected based on the responses of the respective components drawn alone, and especially based on expectations drawn from prior art such as the referenced Dow publication.

The materials which can be used as the core layer include polypropylene polymers including substantially crystalline highly isotactic polypropylene, polyethylene including low, medium and high density polyethylene and linear low density polyethylene which is actually a copolymer of ethylene and a small amount of 1-butene which has properties similar to those of low density polyethylene. The molecular weights of the polypropylene core polymers (in terms of melt flow, M.F.) may range from about 0.1 to 20 M.F., preferably from about 0.7 to 5.0 M.F.

The cap layers should be formed of a material which is selected from the group consisting of polybutene homopolymers and copolymers with ethylene. Polybutene-1 is one example of such a material. Other examples include copolymers of butene-1 with ethylene where the ethylene contents range from 0.1% weight, preferably 0.5% to 6%. Molecular weights of the polybutene polymers (in terms of melt index, M.I.) may range from 0.1 to 1,000 M.I., preferably in the range of 0.5 to 3.0 M.I. It is preferred that the cap layers comprise from about 10% to about 20% of the thickness of the total composite because the influence by the core polymer on the extendability of the caps diminishes at thicknesses greater than about 20% and because the high modulus properties of the laminate derive mainly from the core which therefore must comprise the major proportion of the structure in order to achieve the target of greater than 1.5 mm-psi moduli.

The composites of the present invention have utility in a wide variety of applications. One such application is in the packaging area, for instance, plastic cans. It is also possible to use these highly extended laminates for the repair of existing fracture pipes or for butt joints of pipes. The laminate would be spirally wound in opposing directions to extend beyond the presence of the fracture zone or for a reasonable distance on either side of the butt joint. These materials could be used for auto bumper systems and a variety of energy absorbing uses such as crash components and anti-ballistic structures.

ILLUSTRATIVE EMBODIMENT I

The samples used in these drawing experiments were strips that were 20 cm long by 5 cm wide and cut from coextruded sheets of polypropylene homopolymer of melt flow (M.F.)=0.7 and a copolymer of 6% by weight ethylene and 1-butene of melt index (M.I.) =0.5. Four types of sheet were used in these drawing experiments. A polypropylene core of 30 mils with a 2-4 mil layer of the polybutylene on both sides is referred to as a double capped sheet. A single capped sheet consisted of a 30 mil thick polypropylene base that was coextruded with 2-4 mils of the polybutylene on one side only. Finally, as reference materials, a 30 mil thick sheet of polypropylene only was tested as was a 20 mil thick sheet of only polybutylene. The drawing process was carried out under two separate sets of conditions. In "cold drawing" samples were drawn at room temperature. "Hot drawing" consists of using a localized heating device to increase the "natural draw ratio" of the sheets. The localized heating device used with the Instron tensile tester in laboratory experiments is regarded as the counterpart of the heated drawing rolls in commercial film drawing equipment.

For both drawing processes, a sample containing polypropylene was marked with a felt tipped pen every centimenter along its length so that a draw ratio, $L=l/l_o$, (wherein 1 is the final (drawn) distance between marks and $l_o$ is the initial distance between marks) could be obtained at the end of the experiment. Samples were then creased across the width and mounted in specially designed grips that can hold samples up to 18 cm wide. During deformation, localized necking initiated at the crease and propogated throughout the sample but there was little change in width.

For the cold drawing experiments, no heat was used and the sheets were simply drawn at constant rates of 5, 12.5, 25 or 50 cm/min by an Instron tensile tester. For the hot drawing experiment, the localized heating device was attached to the top of the sheet so that it rode on the slight indentation made by the crease. Then the sheets were drawn at a constant rate of 50 cm/min.

Due to the elastomeric properties of the polybutylene, a separate measurement of L was taken on a sample of pure polymer during the draw process. The polybutylene samples do not neck and deform in a discreet region but rather deform in a uniform fashion over the entire length of the sample. As the deformation process proceeds, the sample decreases in width, "necks-in", and thins as the sample elongates. All of the felt tip marks separate uniformly as the drawing process continues until the sample reaches a critical extension at which point the sheet breaks. As the sheet breaks, it also retracts significantly. Due to the rubbery nature of the sheet, L decreases at failure and is therefore measured while the polybutylene sheet is being drawn.

In order to determine L's for drawn samples containing polypropylene, two or three measurements of the new separation of marks, after drawing, were taken from the center of the sample and then averaged. For those samples where marks could not be distinguished, an overall L was determined by measuring the local length of the drawn material between "necks" and then dividing that number by the length of the undrawn material that was used to produce it. To determine the length of the original undrawn material that underwent deformation, the amount of residual undrawn material was measured and substracted from the initial length of 20 cm.

Several phenomena were observed as a result of the cold drawing process. Coextruded sheets break at lower L's than the polypropylene sample for a given low draw rate. However, coextruded sheets could be drawn at higher rates eventually leading to higher L's. The double capped sheet films had lower L's than the single capped sheet films for a given low draw rate, but again can be drawn at higher rates eventually leading to higher L's. Polybutylene acts as a tough, rubbery material that can be drawn at high rates when its extensibility is facilitated by interaction with the polypropylene core.

Although coextruded sheets had lower L's than pure polypropylene sheets at given low draw rates, double capped sheets could be drawn at higher rates, and therefore to higher L's, without breaking as compared to single cap sheets. Further, the single cap sheets could be drawn at higher rates than pure polypropylene films. It is theorized that the concept of mutual mechanical reinforcement between coextruded materials is responsible for this behavior. Polypropylene in coextruded sheets acts as a high modulus relatively low elongation material at low draw speeds and as a high elongation material at high draw rates when its drawability is facilitated by interaction with the polybutylene caps. Polybutylene is the high elongation material and it is a tough rubbery material that can be drawn at high rates without breaking when its drawability is facilitated by the polypropylene core. The tough polybutylene layers support the polypropylene core and arrest fibrillation and crack propagation at higher draw rates. As the drawing rate is increased, L for double cap sheet also increases. This increase in L for double capped sheet material is presumably due to an increase in L of polypropylene as the draw rate increases. Such an increase is possible provided that there is sufficient mobility of the polymer chains. This mobility is usually achieved by raising the temperature of the sheet. The L of polybutylene alone does not increase significantly with increasing draw rate at room temperature.

The results of these experiments show that the double capped sheets at room temperature have L's which are approximately double those of the high elongation of a butylene at all rates. At higher draw rates at room temperature, polypropylene alone will fail at low total elongation. However, if polypropylene is drawn at higher temperatures, it will reach approximately the same L as double cap sheet at room temperature. The importance of this observation (as shown below in Illustrative Embodiment II) is that lower temperatures at a given draw ratio produce higher strength, stiffness and lower elongation which are the desired properties for the uses of this invention.

The application of the localized heating unit in the hot drawing process causes a significant increase in the L's of the coextruded sheets. The L's of pure polypropylene sheets also increased using the hot drawing process, but the L of the coextruded films increased to a much greater extent. The maximum L obtained for pure polypropylene using the hot drawing method with a drawing rate of 50 cm/min was approximately 11.5. At the same draw rate, double capped sheet had a maximum L of approximately 15.5. It is theorized that mutual mechanical reinforcement is responsible for these improvements. The tough polybutylene material prevents fibrillation and eventual transverse racking of the polypropylene base material and aids in its ductility.

ILLUSTRATIVE EMBODIMENT II

The following sheet samples were employed in the test using commercial oriented polypropylene equipment:
1. PP(5225)/PP(5225)/PP(5225), 3/24/3 mil
2. PB(8010)/PP(5225)/PB(8010), 3/24/3 mil PP(5525) polypropylene homopolymer of melt flow 0.7, PB(8010)=0.6% weight ethylene-butene-1 copolymer of melt index 0.5.

Composition 1—PP/PP/PP. The use of a "homogeneous" coextrudate as the control was simply an attempt to normalize for any effects of the coextrusion process per se on extensibility, although it is not obvious what such factors might be. Preheat roll temperatures up to 155° C. were employed briefly, but 130° C. was applied throughout most of the trial. No optimum was established for monolithic PP sheet. Several MDO (machine direction orienter) roll temperatures were evaluated with a short draw gap (5 mm). The MDO draw rolls are regarded as the counterparts in this commercial equipment of the localized heating device described in Illustrative Embodiment I. The best draw roll temperature found for a single stage of drawing in the first draw roll pair was 140° C. In this condition the maximum draw ratio attained was 9.6. Backing down to 8:1 in MDO-1 gave smooth operation at MDO-2 draw ratios of 1.2-1.3:1 for total draw ratios of 9.6 to 10.4., short or long (100 mm) draw gaps gave similar results. Samples MOPP I, MOPP II, and MOPP VII in Table 1 represents these conditions and the properties that developed. The properties obtained in this set were respectable. Note that a wide spread of properties were obtained within a narrow range of draw ratios and that there was no direct relationship between draw ratio and tensile properties. The results are consistent with experience in the technology that lower draw temperatures and/or shorter draw gaps give higher strength and stiffness and lower elongation at equivalent draw ratios.

When a third stage of machine direction drawing was applied by continuously heating the web from MDO-2 in the TDO-1 oven (tranverse direction orienter) at 130° C. while stretching with the pull rolls at the end of the oven, a total stretch ratio of 11.4 was achieved at a line speed of 21 meters/min. before break was experienced during the next upward rate adjustment. Sample MOPP III (Table 1) is the product of this condition. In this situation our tensile property targets were met, but the product suffered drastic surface fibrillation to yield a curious fuzzy film. The fibrillar condition represents an incipient break and renders the material unacceptable for the applications for which it is intended.

Figure 2:
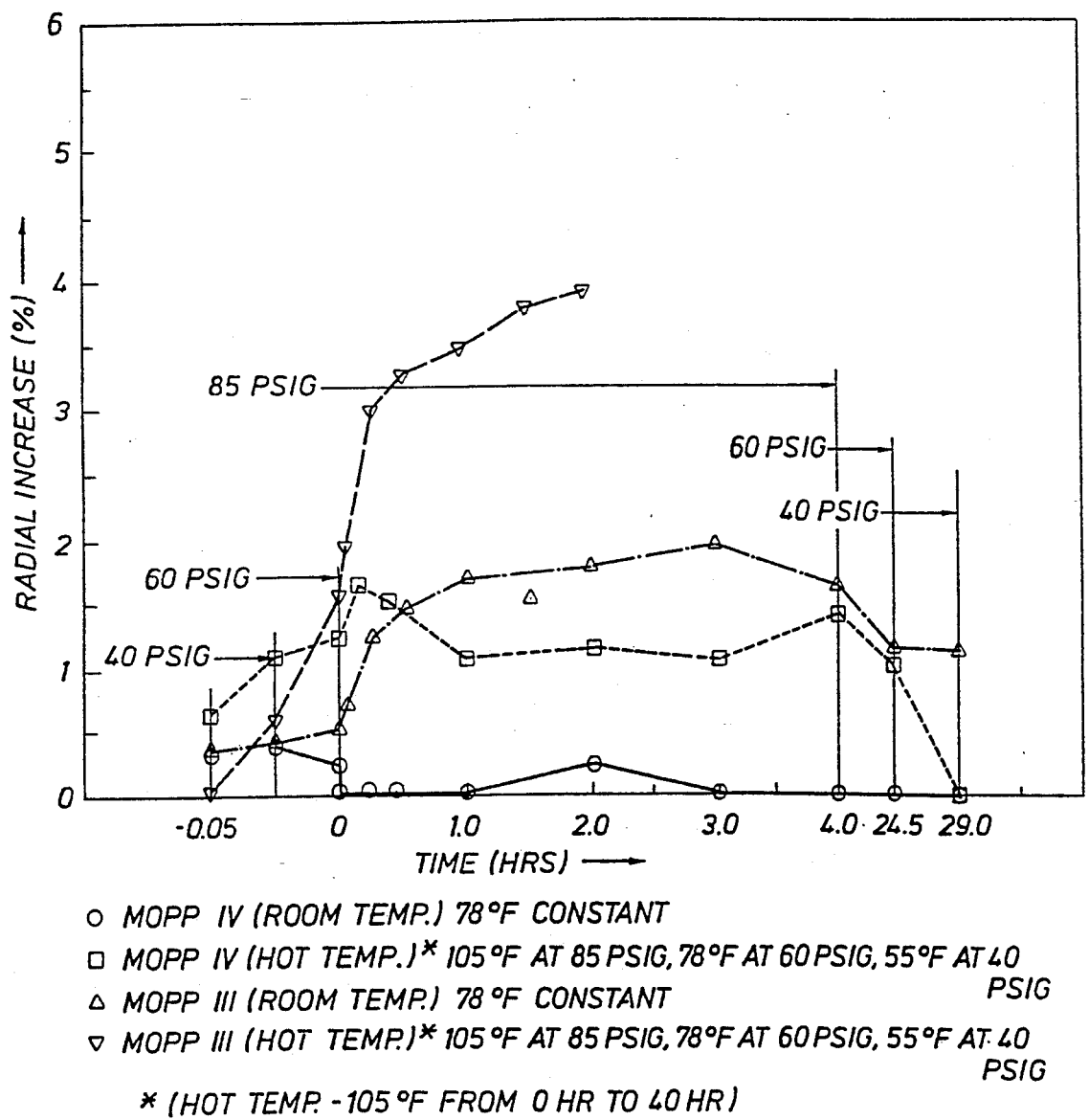

Composition 2—PB/PP/PB. With this composition, both lower preheat and draw roll temperatures, 130° and 140° C., respectively, were required to prevent sticking of the PB cap to the rolls. The teflon-coated preheat rolls worked extremely well with the PB. The TDO-1 oven was again run at 130° C. A long draw gap was employed. The PB/PP/PB was drawn 8:1 in MDO-1, 1.1:1 in MDO-2, and 1.56:1 in TDO-1 for a total draw ratio of 13.9. A line speed of 27.9 meters/min was sustained in this condition during which samples MOPP V and MOPP VI (Table 1) were produced. One distinction between MOPP V and MOPP VI was the deployment of an auxiliary IR heater in MDO during production of MOPP V in an effort to determine if more uniform heating would have a favorable effect. None was evident. It was under these same conditions (and with the auxillary IR heater on) that we achieved our target draw ratio (15.2:1) and line speed (30.4 meters/min.). Sample MOPP IV (Table 1) was produced during this period. FIGS. 1 and 2 compare the creep resistance of samples MOPP III, representative of the drawn PP/PP/PP laminate, with MOPP IV, representative of the drawn PB/PP/PB laminate. Creep is expressed as the volume swell and radial increase of pressurized cylindrical containers which are critical properties for one of the key intended uses of our invention. That is, it is critical that the dimensions of the pressurized container show a minimum change of dimensions in the range of use conditions which involve pressures as high as 85 psig at temperatures as high as 105° F. The results in FIGS. 1 and 2 show that MOPP IV meets the requirements of the particular end use while MOPP III does not.

The tests represented in FIGS. 1 and 2 replicate the time-temperature-pressure conditions of an end-use of the material of our invention as a pressure-bearing container. In these tests the dimensional changes of prototype specimens—volume increase in FIG. 1 and radius increase in FIG. 2—are measured as a function of time of exposure to two different protocols of pressure and temperature, which match the normal ambient use conditions of the container, on the one hand, and the extreme, most stressful conditions to which the container might occasionally be subject, on the other. The criteria for a passing performance rating are, first, that the container not fail under the maximum stress protocol and, second, that volume and radius changes be minimal and remain within tolerances which are defined by certain aspects of the end-use. These tolerances are: (a) volume increase $<12\%$ and radial increase $<3\%$ in the cyclic maximum stress protocol and., (b) volume increase $<4\%$ and radial increase $<2\%$ in the static ambient condition protocol. Maximum recovery to original dimensions on removal or lessening of stress is also a requirement. By measures of all the preceding requirements, the materials of our invention, as represented by MOPP IV meets or exceeds specifications, and the material of conventional technology, represented by MOPP III, fails or is substantially inferior to the material of our invention.

We claim:

1. A polyolefin composite with a tensile strength of at least about 70,000 psi, a 1% secant modulus of at least about 1.5 million psi, elongation at break of no more than 10%, superior creep resistance and which can be drawn to higher draw ratios than single sheets of the polymers of which it is made, which comprises:
    (a) a core layer of a polymer selected from the group consisting of polypropylene, polyethylene and linear low density polyethylene; and
    (b) cap layers of a polymer selected from the group consisting of polybutylene, homopolymers and copolymers with ethylene.
2. The composite of claim 1 wherein the cap layers comprise from about 10 to 20% of the thickness of the composite.
3. The composite of claim 1 wherein the draw ratio of the composite is at least 15.
4. The composite of claim 1 wherein (a) is polypropylene and (b) is polybutene-1 homopolymer or a copolymer of polybutene-1 and from about 0.5 to about 6% ethylene.

* * * * *